United States Patent
Stevenson (10) Patent No.: US 10,927,757 B2
(45) Date of Patent: Feb. 23, 2021

(54) ROTOR BOW MANAGEMENT

(71) Applicant: ROLLS-ROYCE plc, London (GB)

(72) Inventor: Andrew Stevenson, Derby (GB)

(73) Assignee: ROLLS-ROYCE PLC, London (GB)

( * ) Notice: Subject to any disclaimer, the term of this patent is extended or adjusted under 35 U.S.C. 154(b) by 92 days.

(21) Appl. No.: 16/203,664

(22) Filed: Nov. 29, 2018

(65) Prior Publication Data

US 2019/0186359 A1  Jun. 20, 2019

(30) Foreign Application Priority Data

Dec. 15, 2017 (GB) .................................. 1720944

(51) Int. Cl.
*F01D 19/00* (2006.01)
*F02C 6/08* (2006.01)
(Continued)

(52) U.S. Cl.
CPC ................ *F02C 6/08* (2013.01); *F01D 19/00* (2013.01); *F01D 21/06* (2013.01); *F01D 25/34* (2013.01); *F01D 25/36* (2013.01); *F02C 1/02* (2013.01); *F02C 6/16* (2013.01); *F02C 7/32* (2013.01); *F02C 7/277* (2013.01); *F02C 9/18* (2013.01);
(Continued)

(58) Field of Classification Search
CPC ...... F02C 6/08; F02C 6/16; F02C 7/32; F02C 1/02; F02C 7/277; F02C 9/18; F02C 7/268; F01D 25/34; F01D 25/36; F01D 21/06; F01D 19/00; F01D 19/02; F05D 2270/65; F05D 2260/606; F05D 2260/42
See application file for complete search history.

(56) References Cited

U.S. PATENT DOCUMENTS

| | | | | |
|---|---|---|---|---|
| 5,490,377 A | * | 2/1996 | Janes ........................ | F01D 1/00 60/39.12 |
| 5,497,615 A | * | 3/1996 | Noe .......................... | F02C 6/20 60/39.511 |

(Continued)

FOREIGN PATENT DOCUMENTS

| | | |
|---|---|---|
| EP | 1066480 | 10/2006 |
| EP | 2554799 | 2/2013 |

(Continued)

OTHER PUBLICATIONS

Extended European Search Report, issued in European Application 18206657.1, dated Apr. 15, 2019, pp. 1-8, European Patent Office, Munich, Germany.

(Continued)

*Primary Examiner* — Ninh H. Nguyen
*Assistant Examiner* — Brian Christopher Delrue
(74) *Attorney, Agent, or Firm* — Brinks Gilson & Lione (57) ABSTRACT

A method of reducing rotor bow in a high pressure rotor of a gas turbine engine that has in axial flow a low pressure rotor and a high pressure rotor. The method involves storing bleed air from the gas turbine engine when the engine is running to provide stored pneumatic energy; and using that stored pneumatic energy after the engine has been shut-down to rotate the high pressure rotor at a speed and for a duration that reduces rotor bow. A gas turbine engine wherein rotor bow in the high pressure rotor after engine shut-down has been reduced by carrying out the aforesaid method is also disclosed.

13 Claims, 5 Drawing Sheets

(51) Int. Cl.
*F01D 25/36* (2006.01)
*F01D 25/34* (2006.01)
*F02C 7/32* (2006.01)
*F02C 6/16* (2006.01)
*F01D 21/06* (2006.01)
*F02C 1/02* (2006.01)
F02C 7/277 (2006.01)
F02C 9/18 (2006.01)

(52) U.S. Cl.
CPC .... *F05D 2260/42* (2013.01); *F05D 2260/606* (2013.01); *F05D 2270/305* (2013.01); *F05D 2270/65* (2013.01)

(56) References Cited

U.S. PATENT DOCUMENTS

| | | | | |
|---|---|---|---|---|
| 2010/0107594 A1* | 5/2010 | Coffinberry | ............... | F02C 6/08 60/39.093 |
| 2011/0027061 A1* | 2/2011 | Noack | ............... | F01D 25/34 415/1 |
| 2011/0097225 A1* | 4/2011 | Freund | ............... | F04D 17/12 417/423.5 |
| 2013/0049364 A1* | 2/2013 | Teets | ............... | G08G 1/0129 290/45 |
| 2014/0373553 A1* | 12/2014 | Zaccaria | ............... | F02C 7/268 60/778 |
| 2015/0275769 A1* | 10/2015 | Foutch | ............... | F02C 9/18 60/776 |
| 2015/0330309 A1* | 11/2015 | Bagnall | ............... | F02K 3/115 60/785 |
| 2017/0234166 A1* | 8/2017 | Dube | ............... | F01D 25/36 60/779 |
| 2017/0234230 A1* | 8/2017 | Schwarz | ............... | F02C 7/268 60/778 |
| 2017/0234238 A1* | 8/2017 | Schwarz | ............... | F01D 25/34 60/778 |
| 2017/0320585 A1* | 11/2017 | Armstrong | ............. | B64D 27/10 |
| 2017/0356339 A1* | 12/2017 | Nithsdale | ................. | F02C 9/18 |
| 2018/0340474 A1* | 11/2018 | Baladi | ................. | F04D 27/0215 |
| 2019/0323427 A1* | 10/2019 | Mackin | ..................... | F02C 3/04 |
| 2019/0383220 A1* | 12/2019 | Mackin | ................. | B64D 41/00 |

FOREIGN PATENT DOCUMENTS

| | | |
|---|---|---|
| EP | 3051074 | 8/2016 |
| EP | 3246530 | 11/2017 |
| EP | 3 399 157 A1 | 11/2018 |
| GB | 2301635 | 12/1996 |

OTHER PUBLICATIONS

Great Britain Search Report dated Jun. 14, 2018, issued in GB Patent Application No. 1720944.6.

* cited by examiner

ROTOR BOW MANAGEMENT

CROSS-REFERENCE TO RELATED APPLICATIONS

This specification is based upon and claims the benefit of priority from United Kingdom patent application GB 1720944.6 filed on Dec. 15, 2017, the entire contents of which are incorporated herein by reference.

BACKGROUND

Technical Field

The present disclosure concerns gas turbine engines and their manufacture. More specifically, the present disclosure concerns a method of managing rotor bow in gas turbine engines, for example civil aero gas turbine engines.

Description of the Related Art

Gas turbine engines typically have in axial flow a low pressure rotor and a high pressure rotor. Some engines have an intermediate pressure rotor between the low pressure rotor and the high pressure rotor. The rotors are exposed to high temperatures in operation causing them to expand. The high pressure rotor is typically exposed to highest of these temperatures.

When the gas turbine engine is shut down, uneven cooling that occurs between the upper and lower half of the engine, for example due to heat rise, typically causes the engine rotors to bow or deform during cool-down. The high pressure rotor is especially prone to this expansion.

The bowing can become evident in a manner of minutes, e.g. 10 minutes, and last for several hours, e.g. up to eight hours, depending on the engine concerned. If an engine is started while rotor bow is present, there is a risk that compressor blade rub will occur, damaging the engine.

Pilots, generally, and commercial airline operators, specifically, often need to be able to perform engine starts on the ground to strict time lines so it is highly undesirable to have to delay departure solely due to rotor bow or to risk engine wear or engine damage by starting the engine while there is residual rotor bowing.

Existing attempts to address such problems may be summarised as including the dry crank prior to start method and the electric motor drive after shutdown method.

In the dry crank prior to start method, the engine is dry cranked (aka dry cycled) prior to a start at a speed and a duration that is sufficient to reduce any rotor bow that is present to a level that allows the engine to be safely started. Dry cranking means cranking the engine for several minutes at the dead crank speed by the starter motor but with the fuel shut off and the ignitors disabled.

This dry crank prior to start method however requires the engine to be cranked for several minutes and is generally not deemed acceptable by airline operators who typically require an engine start time of less than a minute. This method also risks: oil loss, starter motor overheat and possible rotor lockup.

European patent application EP 3051074 A1 discloses a method of starting an engine that addresses bowed rotor phenomena. The method is an example of the aforementioned dry crank prior to start method. The method of EP 3051074 A1 comprises an acceleration phase where the rotational speed of the rotor is increased toward a combustion speed to force air through the engine; a bowed-rotor cooling phase, during the acceleration phase, where the rotational speed of the rotor is maintained below a bowed-rotor threshold speed until a non-bowed rotor condition is satisfied, wherein the air forced through the gas turbine engine cools the rotor; and a combustion phase, after the bowed-rotor cooling phase and upon reaching the combustion speed, where fuel is supplied to the gas turbine engine and ignition is turned on.

The electric motor drive after shutdown method for addressing rotor bow involves driving the high pressure rotor after engine shutdown via an electrically driven motor mounted on the accessory bear box. United States patent application US 2017/0234166 A1 discloses a bowed rotor prevention system that employs such a method. That system includes a thermoelectric generator operable to produce electricity from waste heat of the engine and the electricity produced by the thermoelectric generator to power a bowed rotor prevention motor operable to drive rotation of turbomachinery of the engine.

The problem with the electric motor drive after shutdown method is providing a suitable electrical supply. Supplying electricity from aircraft power is generally unsuitable as for many aircraft engines, especially civil aero-engines, aircraft power can only be used during an engine start. At all other times, the engine has to be self-sufficient with regards to electrical power. Supplying electricity from battery power is generally unsuitable as the high temperatures experienced in aircraft engines, especially civil aero-engines, raises technical challenges including safety issues as the use of batteries can be a fire hazard. Batteries degrade over time and eventually need to be replaced, typically after 1000 charge/discharge cycles depending on the battery type. Furthermore, the amount of energy stored in a battery cannot be as accurately determined and will typically require close monitoring of voltage/current during charge/discharge cycles. Even if this is implemented, the amount of stored energy can only be estimated.

The present disclosure provides a method of managing rotor bow that overcomes the disadvantages of the methods or at least provides a useful alternative to such methods.

SUMMARY

In a first aspect the present disclosure provides a method of reducing rotor bow in a high pressure rotor of a gas turbine engine that has in axial flow a low pressure rotor and a high pressure rotor, the method comprising the steps of:

storing bleed air from the gas turbine engine when the engine is running to provide stored pneumatic energy; and using that stored pneumatic energy after the engine has been shut-down to rotate the high pressure rotor at a speed and for a duration that reduces rotor bow.

The method of the present disclosure reduces the incidence and/or severity of rotor bow. It also reduces the time between shutting down a gas turbine engine after one flight and safely restarting the gas turbine engine for another flight.

Optional features of the method of managing rotor bow in gas turbine engines of the present disclosure will now be set out. These are applicable singly or in any combination with any aspect of the present disclosure.

The gas turbine engine may comprise in axial flow a low pressure compressor, optionally an intermediate pressure compressor, and a high pressure compressor, and the bleed air is provided by the high pressure compressor.

The stored pneumatic energy may be in the form of compressed air.

The stored pneumatic energy may be provided by a pneumatic energy storage system that comprises an air tank, a pneumatic motor, an accessory gear box and a microcontroller.

The pneumatic energy storage system may be powered by a rechargeable battery that is recharged by a permanent magnet alternator that is driven by the accessory gear box.

The high pressure rotor may be rotated at a speed from 0.1 rpm to 20 rpm for 1 minute to 10 hours.

The high pressure rotor may be rotated at a speed from 0.5 rpm to 15 rpm for 5 minutes to 8 hours.

The high pressure rotor may be rotated continuously for that duration.

The high pressure rotor may be rotated discontinuously for that duration.

The high pressure rotor may be rotated by approximately 180° per rotation.

In a second aspect the present disclosure provides a gas turbine engine that has in axial flow a low pressure rotor and a high pressure rotor, wherein rotor bow in the high pressure rotor after engine shut-down has been reduced by carrying out the aforementioned method.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein The term "rotor bow" as used herein means the axial deformation of a rotor, for example the rotor of a gas turbine engine, that occurs when the rotor cools down after the engine is shut-down, typically as a result of uneven cooling between parts, e.g. typically the upper and the lower halves, of the engine. The bowing can become evident in a manner of minutes, e.g. 10 minutes, and last for several hours, e.g. up to eight hours, depending on the engine concerned.

The term "rotor" as used herein means the shaft or system of shafts that provides the principal and rotational axis of an engine, for example a gas turbine engine.

The term "high pressure rotor" as used herein means the rotor that drives connects a high pressure turbine to a high pressure compressor in a gas turbine engine. When the gas turbine engine is a two-shaft gas turbine engine, there is typically a low pressure turbine and a high pressure turbine that are connected to a low pressure compressor and a high pressure compressor respectively, the high pressure rotor being the faster rotating of the two rotors. When the gas turbine engine is a three-shaft gas turbine engine, there is typically a low pressure turbine, an intermediate pressure turbine and a high pressure turbine that are connected to a low pressure compressor, an intermediate pressure compressor and a high pressure compressor respectively, the high pressure rotor being the fastest rotating of the three rotors.

The term "rotor assembly" as used herein means a shaft or drum with blades attached.

Other than in the operating examples, or where otherwise indicated, all numbers expressing quantities of ingredients used herein are to be understood as modified in all instances by the term "about".

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

DESCRIPTION OF THE DRAWINGS

Certain aspects or embodiments of the present disclosure are described by way of example only, with reference to the accompanying drawings. In the drawings.

DETAILED DESCRIPTION

The present disclosure concerns a method of reducing rotor bow in a gas turbine engine, a pneumatic system for controlling rotor bow in the rotor of a gas turbine engine and a gas turbine engine that comprises that pneumatic system.

As mentioned above, when a gas turbine engine is shut down, it will experience a condition known as rotor bow whereby the engine rotors or shafts experience the effects of a thermal gradient that develops across the upper and lower part of the engine. The natural convection process during cooling results in the lower part of the engine cooling more quickly than the upper part. The engine rotors therefore experience this temperature differential that typically results in a slight bowing of one or more of the rotors, typically the system of rotors, providing the principal and rotational axis of the engine. Rotor bow typically affects the high pressure rotor in particular.

In some cases the degree of deformation of the rotor or system of rotors can be sufficient to damage the engine if it is restarted in that deformed condition, e.g. as a result of compressor blade rub. The deformation reduces as the thermal gradient that causes it gradually dissipates but that can take hours, which can be highly inconvenient for the pilot, crew, passengers and airline operator.

In broad terms the method of reducing rotor bow in a high pressure rotor of a gas turbine engine comprises two steps.

Step (a) of the method of the present disclosure involves storing bleed air from the gas turbine engine when the engine is running to provide stored pneumatic energy.

Step (b) of the method of the present disclosure involves using that stored pneumatic energy after the engine has been shut-down to rotate the high pressure rotor at a speed and for a duration that reduces rotor bow.

The gas turbine engine may comprise, in axial flow, a low pressure turbine, optionally an intermediate pressure turbine, and a high pressure turbine. The gas turbine engine may also comprise, in axial flow, a low pressure compressor, optionally an intermediate pressure compressor, and a high pressure compressor. The construction, pressures and speeds of these turbines and compressors depend on the design of the aircraft concerned.

The bleed air for the method of the present disclosure may be provided by the low pressure compressor, the intermediate pressure compressor (if any), and/or the high pressure compressor of the gas turbine engine. In certain embodiments, the bleed air for the method of the present disclosure is provided by the high pressure compressor, for example from an exit from the high pressure compressor. The bleed air is supplied at a suitable pressure, for example up to 7

MPa (1,015 psia), more especially about 5.5 MPa (800 psia), with the charging taking place at maximum power during take-off.

The pneumatic energy may be stored in the form of compressed air. A suitable pneumatic energy storage system is provided for this purpose.

A pneumatic energy storage system can be self-sufficient with regard to the use of electrical power. However in certain embodiments the pneumatic energy storage system is powered by a rechargeable battery e.g. which is recharged by a permanent magnet alternator that is driven by the accessory gear box. The rechargeable battery may be sized to allow it to be located in a metal housing, for example in the fan case or the aircraft itself and interfaced via low current carrying cables.

In some embodiments stored pneumatic energy can also be used to power one or more other systems after engine shut-down, for example a cooling system. Such a cooling may for example manage heat soak-back on shutdown, i.e. it circulates a cooling medium around heat sensitive systems to prevent them from experiencing excessive engine soak-back temperatures.

In some embodiments, the pneumatic energy storage system comprises an air tank, a pneumatic motor, an accessory gear box, and a microcontroller.

The air tank is pressured with bleed air provided by a compressor of the gas turbine engine, the bleed air being supplied while the engine is running. As mentioned above, in certain embodiments the bleed air is supplied from the high pressure compressor.

In some embodiments, rather than driving a dedicated pneumatic motor, the stored pneumatic energy in the air tank can be supplied to the air turbine starter (ATS) to crank the relevant rotor, for example the high pressure rotor. This reduces the need for a dedicated pneumatic motor on the accessory gear box.

The rotor referred to in step (b) is the high pressure rotor. The low pressure rotor is the rotor that connects the low pressure turbine to the low pressure compressor. The intermediate pressure rotor (if any) is the rotor that connects the intermediate pressure turbine (if any) to the intermediate pressure compressor (if any). The high pressure rotor is the rotor that connects the high pressure turbine to the high pressure compressor. The high pressure rotor is prone to rotor bow because of its location and function in the engine. The problem is more acute when the high pressure rotor is long e.g. to accommodate numerous compressor stages. In certain embodiments where the engine includes an accessory gear box, the high pressure rotor interfaces with the accessory gear box. The engine can be configured so that the accessory gear box is able to rotate the high pressure rotor on shutdown.

The stored pneumatic energy is used after the engine has been shut-down to rotate the high pressure rotor of the engine at a speed and for duration that reduces rotor bow. The suitable speed and the duration will depend, at least in part, on the engine concerned. The suitable speed and duration can also depend, at least in part, on the nature of the flight just taken i.e. the expansion of the high pressure rotor will depend in part on the temperature to which it was exposed during flight, the duration of the flight and/or the speed of the flight.

To conserve energy, the high pressure rotor can be rotated intermittently, for example using a suitable variable duty cycle.

Rotor bow can develop shortly after a gas turbine engine had been shut down so it is generally advisable that the method of the present disclosure is employed shortly after the engine has been shut down, for example within 5 minutes, for example within 2 minutes, of the engine being shut down. Ideally the method of the present disclosure is employed immediately after the engine has been shut down.

In some embodiments, the high pressure rotor is rotated at a speed from 0.1 rpm to 20 rpm, for example from 0.5 rpm to 15 rpm, for 1 minute to 10 hours, for example, for 5 minutes to 8 hours. This will allow the engine to be restarted at any time after being shut down.

In some embodiments, the high pressure rotor is rotated at a speed from 1 rpm to 10 rpm, for example from 1 rpm to 5 rpm, for 1 minute to 10 hours, for example, for 5 minutes to 8 hours. This will allow the engine to be restarted at any time after being shut down.

In some embodiments, the high pressure rotor is rotated at a speed from 1 rpm to 10 rpm, for example from 1 rpm to 5 rpm, for 10 minutes to 6 hours, for example, for 10 minutes to 4 hours. This will allow the engine to be restarted at any time after being shut down.

In some embodiments, the high pressure rotor is rotated at the aforementioned speeds and durations continuously i.e. on a continuous/uninterrupted basis for the duration.

In some embodiments, the high pressure rotor is rotated continuously at a speed from 0.1 rpm to 20 rpm, for example from 0.5 rpm to 15 rpm, for 1 minute to 10 hours, for example, for 5 minutes to 8 hours. This will allow the engine to be restarted at any time after being shut down.

In some embodiments, the high pressure rotor is rotated at the aforementioned speeds and durations discontinuously for that duration i.e. on a discontinuous/intermittent basis for the duration.

For example, instead of rotating the high pressure rotor at a speed from 0.1 rpm to 20 rpm for a continuous period of 2 minutes to 10 hours, the high pressure rotor is rotated at a speed from 0.1 rpm to 20 rpm for two periods of 2 minutes to 4 hours separated by a period of 5 minutes to 10 minutes. The speed or rotation, duration of rotation and the length of time between rotations, i.e. the dwell time, can be suitably determined by the person skilled in the art in order to reduce rotor bow. Rotating the high pressure rotor on an intermittent basis means the pneumatic energy storage system only needs to provide energy intermittently. This can extend the period that pneumatic energy storage system can be operated.

In some embodiments, the high pressure rotor is rotated at a speed from 0.1 rpm to 20 rpm, for example from 0.5 rpm to 15 rpm, for 2 minutes to 1 hour, for example, for 3 minutes to 30 minutes, then not rotated for 2 minutes to 10 minutes, for example, for 3 minutes to 5 minutes, and cycled accordingly so that the engine can be restarted at any time after being shut down.

In some embodiments the speed of rotation and/or the duration of rotation and/or the length of the dwell time are varied between cycles to optimise the reduction of rotor bow.

In some embodiments, the high pressure rotor is rotated by approximately 180° per rotation. In this way a minimal amount of stored pneumatic energy is used to optimally correct for rotor bow as the high pressure rotor will tend to bow in upwards and when rotated 180° the rotor will gradually to return to an unbowed condition i.e. in alignment with the rotational axis of the engine. Minimising the amount of stored pneumatic energy used to reduce rotor bow enables smaller and lighter tanks to be used to store the bleed air that provides the stored pneumatic energy. Reducing weight in the engine improves specific fuel consumption (SFC).

In broad terms the present disclosure also provides a gas turbine engine that has in axial flow a low pressure rotor and a high pressure rotor, wherein rotor bow in the high pressure rotor after engine shut-down has been reduced by carrying out the aforementioned method.

Figure 1:
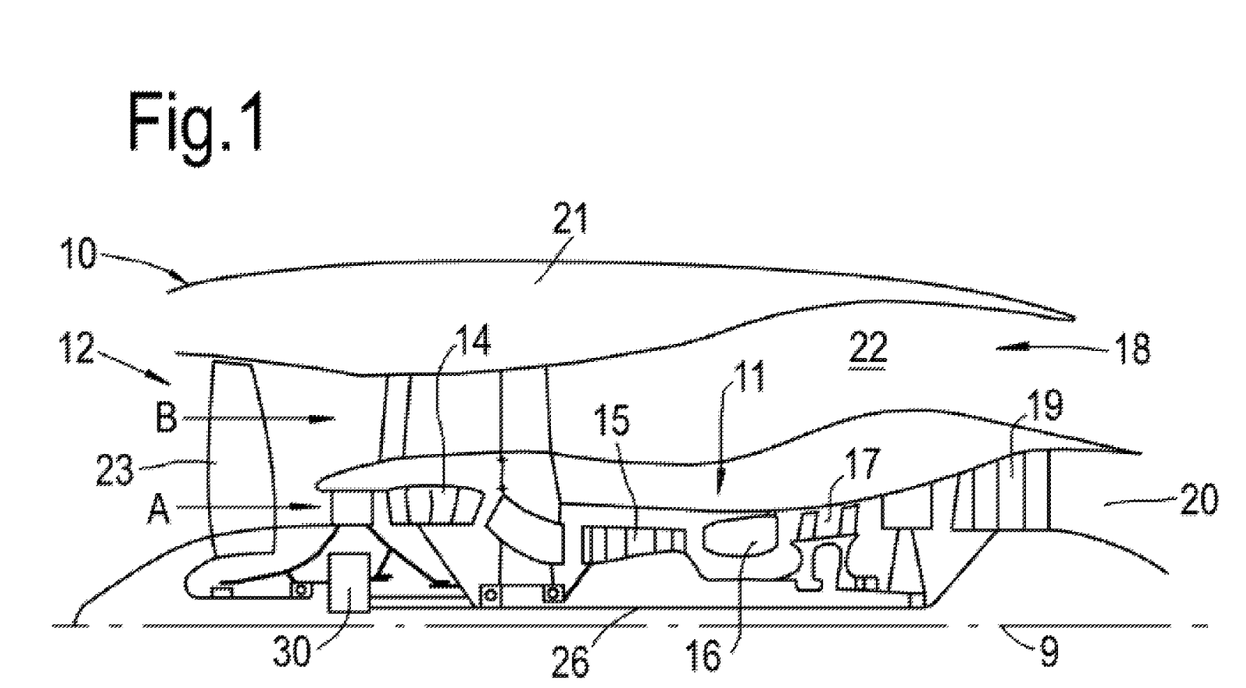
FIG. 1 is a sectional side view of a gas turbine engine.

Certain embodiments will now be described by way of example only:

FIG. 1 illustrates a gas turbine engine 10 having a principal rotational axis 9. The engine 10 comprises an air intake 12 and a propulsive fan 23 that generates two airflows A and B. The gas turbine engine 10 comprises a core engine 11 having, in axial flow A, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via a shaft 26 and an epicyclic gearbox 30.

The gas turbine engine 10 works in a conventional manner with air in the core airflow A being accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 generally provides the majority of the propulsive thrust. The epicyclic gearbox 30 is a reduction gearbox.

Figure 2:
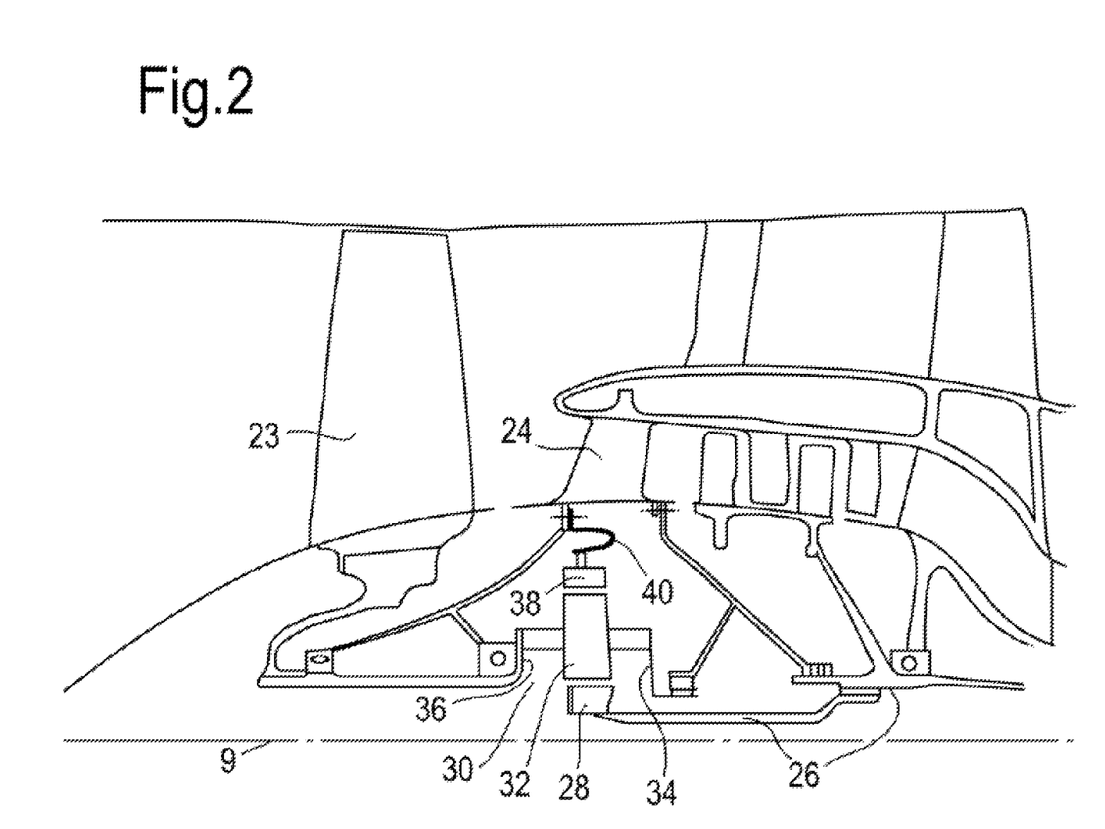
FIG. 2 is a sectional side view of a known mechanical arrangement of a geared fan gas turbine engine.

A known mechanical arrangement for a geared fan gas turbine engine 10 is shown in FIG. 2. The low pressure turbine 19 drives the shaft 26, which is coupled to a sun wheel, or sun gear, 28 of the epicyclic gear arrangement 30. Radially outwardly of the sun gear 28 and intermeshing therewith, in a conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The epicyclic gearbox 30 is of the planetary type, in that the planet carrier 34 rotates about the sun gear 28 and is coupled to an output shaft via linkages 36. In other applications the gearbox 30 may be a differential gearbox in which the ring gear 38 also rotates in the opposite sense and is coupled to a different output shaft via linkages 40.

An epicyclic gearbox 30 must be lubricated, by oil or another fluid. However, the oil becomes heated by being worked during operation of the epicyclic gearbox 30. Furthermore, the oil may accumulate particulate debris from the components of the epicyclic gearbox 30 which may cause seizing or other problems. It is therefore necessary to eject the oil efficiently from the epicyclic gearbox 30 to allow its replacement by spraying in fresh, cool oil. Ejection of the oil, particularly when it is collected for cleaning before being returned to the reservoir from which fresh oil is supplied, is referred to as oil scavenge.

Figure 3:
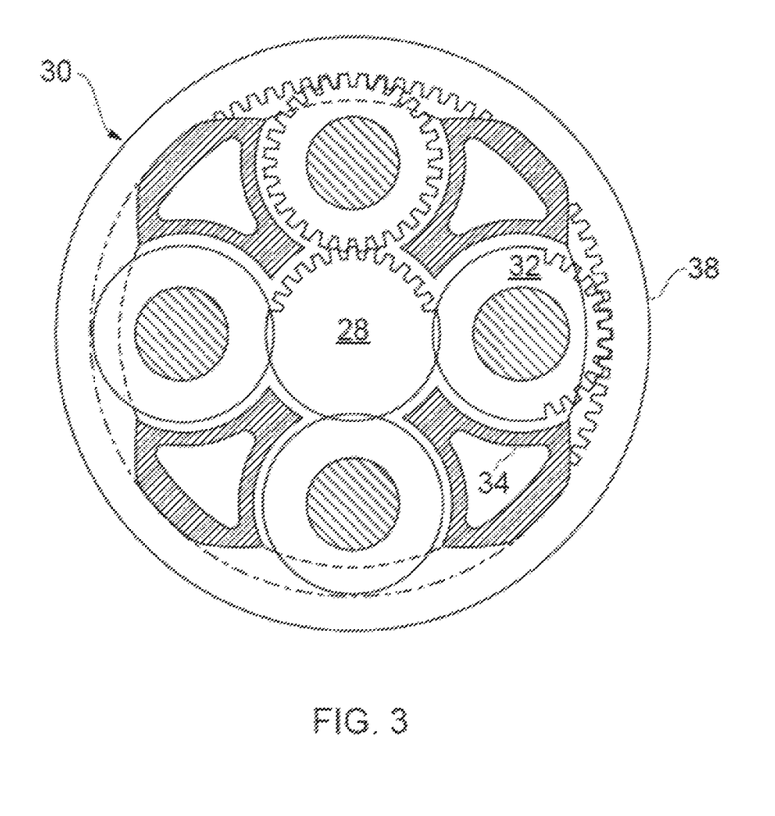
FIG. 3 shows a typical arrangement of an epicyclic gearbox for the geared fan gas turbine engine shown in FIG. 2.

A typical arrangement of the epicyclic gearbox is shown in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

Additionally or alternatively the gearbox may drive additional and/or alternative components (e.g. the intermediate pressure compressor and/or a booster compressor, propeller (aero or hydro), or electrical generator). Additionally or alternatively such engines may have an alternative number of compressors and/or turbines and/or an alternative number of interconnecting shafts.

Figure 4:
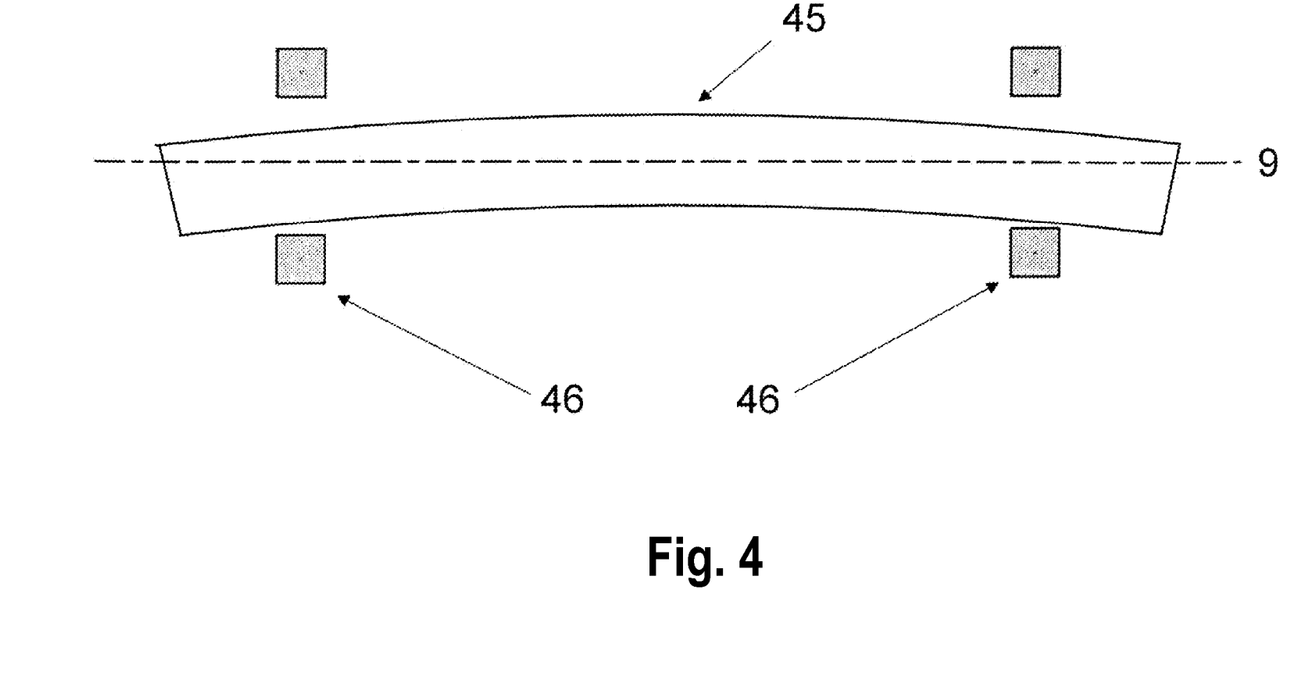
FIG. 4 is a diagrammatic sectional side view of a rotor of a gas turbine engine, the rotor experiencing rotor bow.

FIG. 4 is a sectional side view of a rotor of a gas turbine engine experiencing rotor bow. The rotor 45 shown is deformed with respect to the bearings 46 that support the rotor and the principal and rotational axis 9 of the engine.

Figure 5:
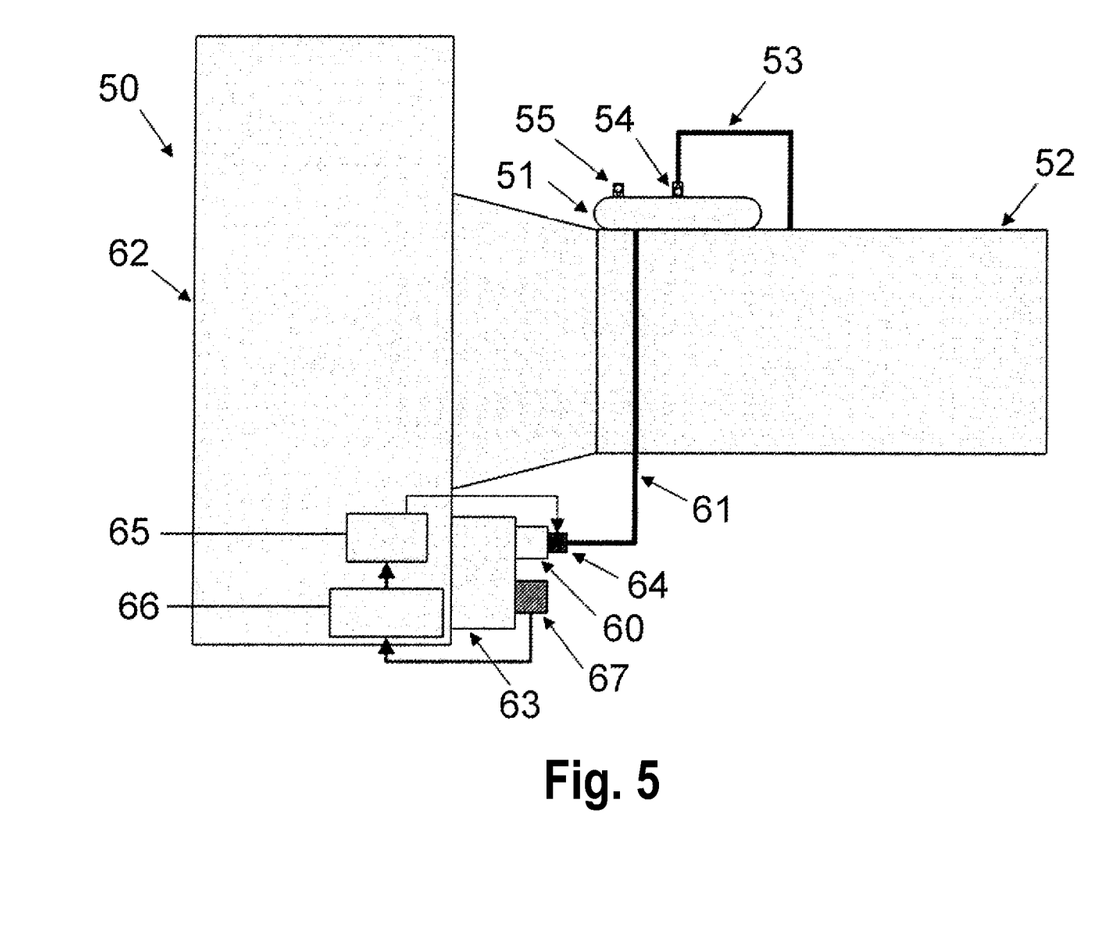
FIG. 5 is a diagrammatic overview of a pneumatic system of the present disclosure that controls rotor bow.

FIG. 5 depicts one embodiment of a pneumatic energy storage system that is suitable for use in the method of the present disclosure. The pneumatic energy storage system 50 includes an air tank 51 that is mounted on the engine core 52 of a gas turbine engine. Bleed air is provided by the high pressure compressor (not shown) within the engine core 52 through a pipe 53. A one-way valve 54 controls the flow of bleed air into the air tank 51. The air tank 51 has a pressure relief valve 55 that acts to prevent the air tank 51 from exceeding its safe operating pressure. As a guide, scuba diving tanks can be filled at pressures of up to about 25 MPa (3,625 psia), i.e. well above the suitable pressure of the bleed air in the air tank 51, which is example up to 7 MPa (1,015 psia), more especially about 5.5 MPa (800 psia).

Pressurised air from the air tank 51 is provided to a pneumatic motor 60 via a pipe 61. The pneumatic motor 60 is attached to an engine fan case 62 via an accessory gear box 63. A solenoid valve 64 is provided to control the flow of bleed air from the pipe 61 into the pneumatic motor 60. The solenoid valve 64 is operated by a micro-controller 65, which is powered by a re-chargeable battery 66. The re-chargeable battery 66 is charged by a permanent magnet alternator (PMA) 67 that is mounted on the accessory gear box 63. The air tank 51 may be provided with a pressure sensor (not shown) that is connected to the micro-controller 65. This pressure sensor may be used to monitor the pressure of the air stored in the air tank 51 so that the micro-controller 65 can make the best use of the stored energy i.e. by using a schedule appropriate for the amount of energy stored. The pressure sensor can also be used to detect and report faults with the system such as an air leak in the air tank, valves or pipework.

In use, bleed air from a compressor, for example a high pressure compressor, is supplied into air tank 51 via the one-way valve 54 while the engine is running, for example at maximum power during take-off. In some embodiments the bleed air is sourced from the exit of the high pressure compressor, for example up to 7 MPa (1,015 psia), more especially about 5.5 MPa (800 psia). After the aircraft has landed and the engine has been shut down, the battery powered micro-controller 65 operates the solenoid valve 64 to schedule air from the air tank 51 via the pipe 61 to the pneumatic motor 60 that is mounted on a drive pad (not shown) of the accessory gear box 63. The accessory gear box 63 rotates the rotor for a time and at a low speed that is sufficient to prevent the rotor from bowing or at least minimise the extent of any bowing and/or reduce the time needed for any bowing to dissipate to a level that is safe for restarting the engine. The accessory gear box 63 may rotate the rotor periodically a low speed, for example about 1 rpm, to prevent excessive rotor bowing.

The rechargeable battery 66 is charged by the permanent magnet alternator 67 on the accessory gear box 63 when the engine is running. The amount of energy stored in a battery is determined and monitored using suitable means, for example with reference to the voltage and current during charge and discharge cycles.

In the arrangement shown in FIG. 5 the pneumatic motor 60 is mounted on the accessory gear box 63 however the pneumatic motor 50 may alternatively be provided as a standalone unit or it may be integrated into one of the accessories mounted on the accessory gear box 63.

The pneumatic motor may be provided with a clutch (not shown) that automatically disengages the pneumatic motor from the accessory gear box 63 to prevent the pneumatic motor from being rotated at excessive speeds when the engine is running. The clutch may be a sprag clutch or a similar clutch device.

The amount of stored pneumatic energy can be accurately calculated by measuring the pressure of the air tank.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of reducing rotor bow in a high pressure rotor of a gas turbine engine that has in axial flow a low pressure rotor and a high pressure rotor, the method comprising the steps of:
   storing bleed air from the gas turbine engine when the engine is running to provide stored pneumatic energy, wherein the stored pneumatic energy is provided by a pneumatic energy storage system that comprises an air tank, a pneumatic motor, an accessory gear box and a microcontroller; and
   using the stored pneumatic energy after the engine has been shut-down to rotate the high pressure rotor at a speed and for a duration that reduces rotor bow,
   wherein the pneumatic energy storage system is powered by a rechargeable battery that is recharged by a permanent magnet alternator that is driven by the accessory gear box.

2. A method according to claim 1, wherein the gas turbine engine comprises in axial flow a low pressure compressor, and a high pressure compressor, and wherein the bleed air is provided by the high pressure compressor.

3. A method according to claim 2, wherein the gas turbine engine comprises in axial flow an intermediate pressure compressor.

4. A method according to claim 1, wherein the stored pneumatic energy is in the form of compressed air.

5. A method according to claim 1, wherein the high pressure rotor is rotated at a speed from 0.1 rpm to 20 rpm for 1 minute to 10 hours.

6. A method according to claim 5, wherein the high pressure rotor is rotated continuously for that duration.

7. A method according to claim 5, wherein the high pressure rotor is rotated discontinuously for that duration.

8. A method according to claim 7, wherein the high pressure rotor is rotated by approximately 180° per rotation.

9. A method according to claim 1, wherein the high pressure rotor is rotated at a speed from 0.5 rpm to 15 rpm for 5 minutes to 8 hours.

10. A method according to claim 9, wherein the high pressure rotor is rotated continuously for that duration.

11. A method according to claim 9, wherein the high pressure rotor is rotated discontinuously for that duration.

12. A method according to claim 11, wherein the high pressure rotor is rotated by approximately 180° per rotation.

13. A pneumatic system for controlling rotor bow, the system comprising:
   an air tank configured to receive compressor bleed air from a compressor of a gas turbine engine when the engine is running, the air tank further configured to provide stored pneumatic energy, wherein the gas turbine engine has, in axial flow, a low pressure rotor and a high pressure rotor;
   a valve configured to control the flow of the compressor bleed air into the air tank;
   an accessory gearbox configured to rotate the low pressure rotor and the high pressure rotor;
   a pneumatic motor or an air turbine starter configured to rotate the high pressure rotor with the stored pneumatic energy after the engine is shut down for a duration that reduces rotor bow;
   a permanent magnet alternator driven by the accessory gearbox;
   a re-chargeable battery configured to be re-charged by the permanent magnet alternator, wherein the re-chargeable batter is configured to power the pneumatic system.

* * * * *